Patented May 18, 1948

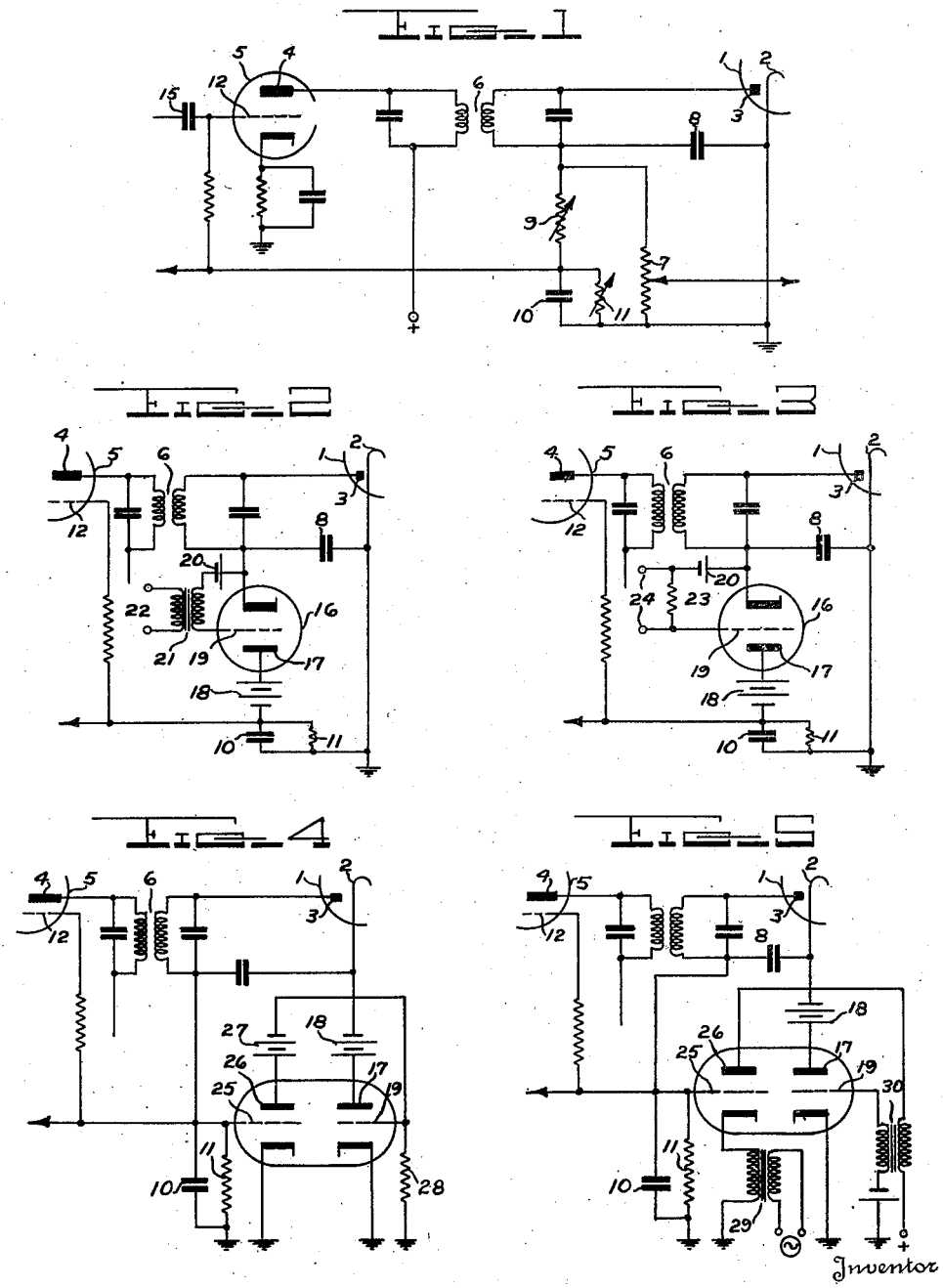

2,441,577

UNITED STATES PATENT OFFICE 2,441,577

AUTOMATIC VOLUME CONTROL MEANS

Martin Katzin, Washington, D. C.

Application April 17, 1943, Serial No. 483,531

8 Claims. (Cl. 179—171)

(Granted under the act of March 3, 1883, as amended April 30, 1928; 370 O. G. 757)

In the type of homing system employing a rotating beam periodically intercepted by ships in flight, the operation of the receiving system is attended by many difficulties. High interference levels exist at the receiving installation due to the operation of ignition and other electrical apparatus. Furthermore, the level of the signal intercepted varies enormously in dependency on the distance from the transmitter location as the ship approaches base. If the receiver is maintained at high gain not only may it periodically block from interference pulses and become undependable for receiving the desired signal, but it may also detect low level subordinate lobes from the homing transmitter which are sufficiently amplified to become indistinguishable from the main lobe output under saturating levels resulting therefrom in the receiver. On the other hand, gain sufficient to insure certainty of reception must be provided. It has been discovered that automatic gain control systems previously known are inadequate to meet the problems present under these circumstances, and in some respects multiply the difficulties of operation.

As is understood, the A. G. C. system controls the gain of the receiver by the application of a negative biasing voltage to one or more grids preceding the demodulator, such voltage being proportional in magnitude to the signal received at the demodulator. The voltage is supplied to a storing capacity through a charging resistance R, usually the resistance of the demodulator during its conducting period, and the speed of response of the system is determined by the time constant of the R.-C. combination.

In view of the short duration of the homing signal at any individual position, the storage circuit of the A. G. C. system should charge quickly in order to be effective for its purpose, but discharge slowly relative to the period of rotation of the homing beam. If this operation is obtained, however, the high level interference peak will also affect the A. G. C. system and this will result in maintaining too low an average sensitivity in the receiver. If a slow response is obtained from the A. G. C. circuit, then the same will not be able to function at all during the period of time the homing signal is received. The problems present are increased by the wide variation in homing signal level in absolute magnitude and in its ratio to interference signal level. There are thus two time constants of importance, the charging time constant, and the discharging time constant, the latter being the one usually considered in A. G. C. circuits. At low signal levels in remote position, the interference level is overriding and longer charging time constant with high sensitivity is required, whereas on approaching base with higher signal levels and better signal-interference ratio, decreased sensitivity is required, and shorter charging time constant may be employed without blocking the receiver to the desired signal while eliminating secondary lobe reception.

Accordingly it is an object of the invention to provide an auxiliary receiver control circuit operative to vary sensitivity and A. G. C. charge and discharge time constants.

It is a further object of the invention to provide a control circuit simultaneously operative to increase the charging time constant of the A. G. C. system and increase the sensitivity of the receiver.

Another object of the invention is to provide means for remotely controlling the operation of an automatic gain control system.

Fig. 1 is a diagrammatic representation of the auxiliary control circuit;

Fig. 2 is a diagrammatic representation of another embodiment of the auxiliary control adapted for remote control;

Fig. 3 is a diagrammatic representation of a further auxiliary control circuit similar to that shown in Fig. 2; and Figs. 4 and 5 are diagrammatic representations of further embodiments of the invention.

The circuit as shown in Fig. 1 comprises a diode 1 including cathode 2 and anode 3, which is fed from anode 4 of amplifier tube 5 through coupler 6. It will be understood that the tubes 1 and 5 are conventional components of radio receivers, and that tube 1 in particular may be the diode detector or an A. G. C. tube. In the first case the audio signal may be taken off potentiometer 7.

The radio or intermediate frequency supplied diode 1 is rectified, the high frequency components being bypassed through condenser 8, the audio and direct components traversing potentiometer 7 and variable resistor 9 and condenser 10 and resistor 11. The voltage developed across condenser 10 and resistor 11 is applied as a bias to the grid or grids of tubes preceding diode 1, and in Fig. 1 is fed to signal grid 12 of amplifier tube 5, which may also receive the high frequency signal voltage through condenser 15.

Through the circuit disclosed the gain of the receiver preceding the diode is controlled by the biasing voltage supplied across condenser 10 and resistor 11. As an increasingly negative voltage is developed across 10 with increasing signal, the gain is cut down with increasing signal level to obtain approximately a constant output level from the receiver, such as may be obtained from divider 7, substantially independent of signal variation.

In the above discussion of the problem to which the invention is directed, it was pointed out that variation of the charging time constant was required to accommodate the action of the A. G. C. system to varying condition of interference and signal level. This is accomplished by variation of resistor 9, which controls the charging time constant $t = C_{10}R_9R_{11}/(R_9+R_{11})$.

When desirable, the discharge time constant may also be made adjustable by employment of a variable resistance in shunt with the storing capacitor 10, such being shown in Fig. 1.

Through the circuit of the invention, variation of resistor 9 simultaneously controls in addition to the time constant, the sensitivity of the receiver. This function is the result of resistor 11 in parallel with condenser 10. Resistor 11 operates with variable resistance 9 as a voltage divider to control the maximum A. G. C. voltage under any set of conditions, the voltage supplied to the A. G. C. bus having a ratio to the voltage developed across the diode load of $R_{11}/(R_9+R_{11})$.

It will therefore be understood that as the charging time constant of the circuit is increased to meet low signal-interference ratios, the sensitivity is simultaneously increased by decreasing the negative bias to the A. G. C. grids.

The circuit shown in Fig. 2 is similar to that of Fig. 1, with the exception that provision is made for remote operation by application of a control voltage to tube 16 which is caused to vary its plate resistance and thereby functions as variable resistor 9 of Fig. 1.

Resistor 11 and condenser 10 are connected to the plate 17 of tube 16 through battery 18, which supplies enough potential for dependable operation of the tube by its control grid 19. The control grid 19 is biased by battery 20 and receives an A. C. control voltage through transformer 21. The voltage supplied by battery 20 may bias tube 16 to cut off, whereby A. G. C. action will take place only with application of a control potential to grid 19. The cathode of tube 16 is connected to the output of coupler 6.

By application of a variable A. C. voltage to terminals 22 of transformer 21, the average resistance of tube 16 may be controlled by the amplitude of the control voltage, and thus the sensitivity and charging time constant adjusted as desired.

The circuit shown in Fig. 3 is similar to that of Fig. 2, with the exception that the resistance of tube 16 may be controlled by either a D. C. or A. C. voltage applied to terminals 24. Resistor 23 is placed across the control terminals in case the control voltage supply does not provide a suitable D. C. path.

In the embodiment shown in Fig. 4, automatic variation of the sensitivity and charging time constant in dependency on the received signal strength is effected by employment of the A. G. C. bus voltage to control the resistance of the load circuit triode. Consequently with low signal level the A. G. C. has a long charging time and high sensitivity, whereas with high signal level on approaching base the time constant is decreased with decreasing resistance in the load circuit tube and simultaneously the sensitivity is decreased by the increased ratio of A. G. C. voltage to R. F. signal fed to the A. G. C. diode.

In Fig. 4 the load circuit tube is placed between the diode cathode and ground, the anode 17 being connected to diode cathode 2. Control grid 19 is coupled to the A. G. C. bus voltage through a triode, shown in the same envelope with the load circuit triode, whose control grid 25 is directly connected to the A. G. C. bus. Anode 26 of the coupling triode, is provided with a low positive potential by battery 27 and develops across its load resistance 28 a control voltage applied to grid 19.

In the circuit of Fig. 4 the biasing voltage applied to grid 25 is primarily determined by the voltage developed across the storing circuit $C_{10}R_{11}$ by the R. F. signal, as the anode batteries in the circuit do not provide voltages of sufficient magnitude to mask the basic operation of the circuit as described in connection with Fig. 1. As the R. F. signal level increases, the anode current of the coupling tube decreases, and the voltage developed across load resistance 28, which biases grid 19 negative, decreases. Consequently the internal resistances of the load circuit triode decreases, to shorten the charging time constant and decrease the sensitivity as above explained.

The circuit of Fig. 5 is similar to that of Fig. 4, but the coupling triode is cathode modulated at an alternating voltage through transformer 29, and the output is applied to grid 19 of the load circuit triode by coupling transformer 30. The average resistance of this tube is therefore controlled as in the circuit of Fig. 2.

Although I have shown and described certain and specific embodiments of this invention I am fully aware of the many modifications possible thereof. This invention is not to be restricted except insofar as is necessitated by prior art and by the spirit of the appended claims.

The invention described herein may be manufactured and used by or for the Government of the United States of America for governmental purposes without the payment of any royalties thereon or therefor.

I claim:

1. A gain control circuit including a vacuum tube amplifier, a rectifier fed by the amplifier, a load circuit for the rectifier including in series a vacuum tube connected in conducting relation to the current passed by the rectifier, and a condenser and resistor in parallel; gain control means in said amplifier response to the voltage developed across the condenser and resistance, a control electrode in the load circuit vacuum tube, and means for applying a control voltage thereto.

2. A gain control circuit including a vacuum tube amplifier, a rectifier fed by the amplifier, a load circuit for the rectifier including in series a vacuum tube connected in conducting relation to the current passed by the rectifier, and a condenser and resistance in parallel; gain control means in said amplifier responsive to the voltage developed across the condenser and resistance, a control electrode in the load circuit vacuum tube, and means for applying an alternating voltage thereto for controlling the average resistance of said tube.

3. A gain control circuit including a vacuum tube amplifier, a rectifier fed by the amplifier, a load circuit for the rectifier including in series a vacuum tube connected in conducting relation to the current passed by the rectifier, and a condenser and resistance in parallel; gain control means in said amplifier responsive to the voltage developed across the condenser and resistance, a control electrode in the load circuit vacuum tube, means operative to supply cut-off bias to said control electrode; and means for applying a control voltage to said control electrode.

4. A gain control circuit including a vacuum tube amplifier, a rectifier fed by said amplifier, storage means connected in a load circuit of said rectifier, gain control means in said amplifier responsive to the voltage developed across the storage means, and means responsive to the voltage developed across the storage means operative to control the charging time constant thereof, and to control the proportion of the voltage supplied by the rectifier developed across the storage means.

5. A gain control circuit including a vacuum tube amplifier, a rectifier fed by said amplifier, storage means connected in a load circuit of said rectifier, gain control means in said amplifier responsive to the voltage developed across the storage means, and means responsive to the voltage developed across the storage means operative to control the charging time constant thereof independently of its discharge time constant, and to control the proportion of the voltage supplied by the rectifier developed across the storage means.

6. A gain control circuit including a vacuum tube amplifier, a rectifier fed by said amplifier, a load circuit for the rectifier, a storage circuit connected in the load circuit of said rectifier, means for applying the voltage developed across the storage circuit to a grid of said amplifier, and means responsive to the amplitude of the voltage developed across the storage circuit operative to control the proportion of the voltage across the rectifier load circuit developed across the storage circuit.

7. A gain control circuit including a vacuum tube amplifier, a rectifier fed by said amplifier, a load circuit for the rectifier, a storage circuit connected in the load circuit, means for applying the voltage developed across the storage circuit to a grid of said amplifier, a vacuum tube connected in conducting relation in the load circuit, and means for controlling the resistance of said tube operating in dependency on the voltage developed across the storage circuit.

8. A gain control circuit including a vacuum tube amplifier, a rectifier fed by the amplifier, a load circuit for the rectifier including in series a vacuum tube connected in conducting relation to the current passed by the rectifier, and a condenser and resistor in parallel; gain control means in said amplifier responsive to the voltage developed across the condenser and resistance, a control electrode in the load circuit vacuum tube, and further means responsive to the voltage developed across the condenser and resistance operative to apply a control voltage to said control electrode.

MARTIN KATZIN.

REFERENCES CITED

The following references are of record in the file of this patent:

UNITED STATES PATENTS

| Number | Name | Date |
|---|---|---|
| 1,959,062 | Place | May 15, 1934 |
| 2,053,536 | Schlesinger | Sept. 8, 1936 |
| 2,058,565 | Case | Oct. 27, 1936 |
| 2,083,501 | Lane, Jr. | June 8, 1937 |
| 2,088,179 | Roberts | July 27, 1937 |
| 2,135,560 | Carlson | Nov. 8, 1938 |
| 2,135,942 | Koch | Nov. 8, 1938 |
| 2,144,304 | Braden | Jan. 17, 1939 |
| 2,145,372 | Riddle, Jr. | Jan. 31, 1939 |
| 2,156,078 | Beggs | Apr. 25, 1939 |
| 2,159,240 | Wheeler | May 23, 1939 |
| 2,161,296 | Delvaux | June 6, 1939 |
| 2,221,541 | Hathaway | Nov. 12, 1940 |
| 2,243,423 | Hollingsworth | May 27, 1941 |
| 2,262,841 | Goddard | Nov. 18, 1941 |
| 2,259,906 | Neustadt | Oct. 21, 1941 |
| 2,266,516 | Russell | Dec. 16, 1941 |
| 2,318,075 | Hollingsworth | May 4, 1943 |